Feb. 14, 1933.  F. W. REUTER  1,897,621
CASSETTE
Filed Dec. 23, 1929

Inventor
Frederic W. Reuter
By
Cyrus N. Anderson
Attorney

Patented Feb. 14, 1933

1,897,621

UNITED STATES PATENT OFFICE

FREDERIC W. REUTER, OF TOWANDA, PENNSYLVANIA

CASSETTE

Application filed December 23, 1929. Serial No. 415,886.

My invention relates to cassettes which are used in X-ray photography as a mounting for intensifying screens and for holding sensitized films or plates in close relation to the said screens.

The screens are provided upon their surfaces with a coating or layer of a suitable fluorescent material which fluoresces when X-rays impinge thereupon and radiates actinic light. The effect of this light is added to that of the X-rays on the photographic film or plate which may be associated therewith, thereby increasing the photographic effect on the film for a given exposure. The action of such screens in X-ray photography is known and need not be described further.

It is essential in X-ray photography in order that the best or even satisfactory results may be obtained that the sensitized plate or film shall be located and held in contact with the surface or surfaces of the intensifying screen or screens. In cassettes as heretofore constructed the front plates thereof have been connected rigidly with a suitable frame of relatively light material such as aluminum, wood, etc. The covers therefor are held in place by relatively strong springs. The continued use of these springs for holding the cover of a cassette in place results ultimately in causing the front plate to spring and belly out, with the result that sooner or later a condition is created such that the sensitized plate or film contained in the cassette does not contact with the fluorescent screen. As is known, a photograph taken under those conditions frequently if not always is blurred and lacks definiteness.

The front plates of cassettes as heretofore constructed have been connected to the frames of the structures in such way that the repair of the cassette by the renewal or otherwise of such plates has been and is a relatively expensive procedure, costing practically as much as it would to replace the entire cassette.

The general object of my invention is to provide a cassette of novel construction wherein the front plate thereof is mounted upon but is unconnected with the frame of the cassette whereby it may be removed readily for repair or for replacement by another plate.

It is desirable in the case of cassettes that in the manipulation thereof there shall not be relative movement between the cover and the front plate of the cassette, and it therefore is a further object of my invention to provide a construction wherein there will not or is not likely to be relative movement between these parts, whereby the danger of marring the screen or a sensitive plate or film located between the cover and the front plate is reduced to a minimum.

A still further object of my invention is to provide a construction wherein relative movement between the supporting frame of the cassette and the cover and front plates may be permitted, which characteristic renders unlikely relative movement between the front plate and the cover.

Without attempting at this point in the specification to set forth all of the objects and purposes of my invention I shall proceed with a detailed description thereof wherein other objects and purposes thereof will be particularly mentioned or else will become apparent therefrom.

In order that the invention may be understood readily and its practical advantages fully appreciated reference should be had to the accompanying drawing wherein I have illustrated certain forms of embodiment thereof, the said forms being those which at present are preferred by me.

Figure 1:
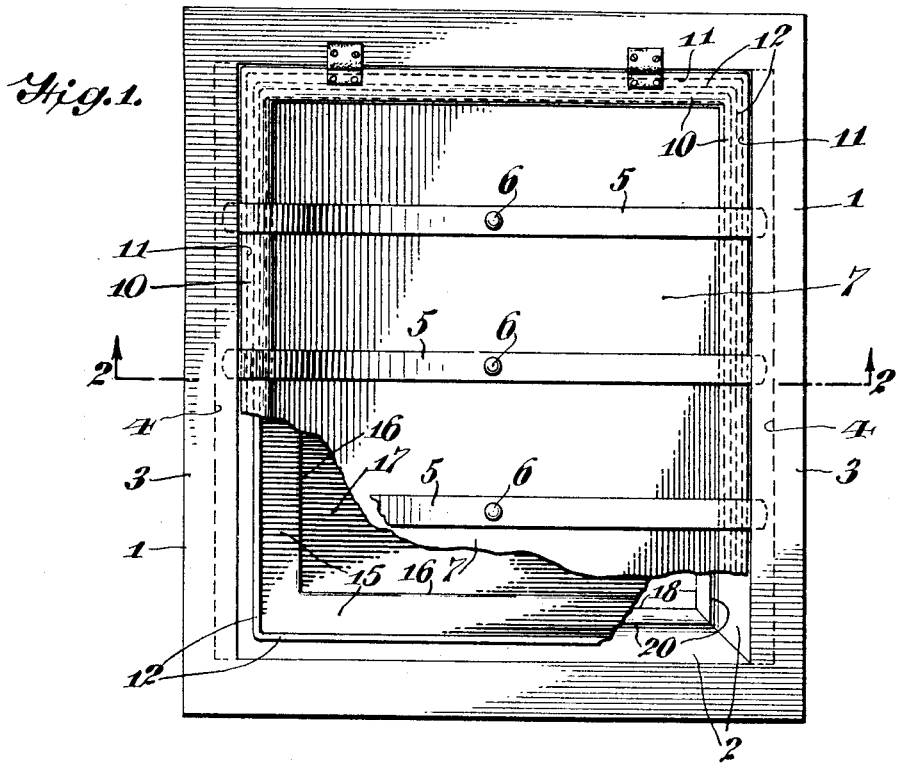
Fig. 1 is a view in plan of the side comprising the cover of a cassette embodying my invention, a portion of the cover or top being broken away to disclose certain details of construction.
Figure 2:
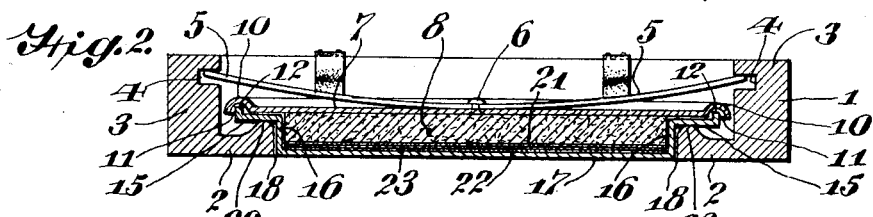
Fig. 2 is a transverse sectional view taken on the line 2—2 of Fig. 1.
Figure 3:
Fig. 3 is a similar view showing a modified construction of cassette embodying the invention.

In the drawing 1 designates a frame which may consist of a suitable preferably relatively light material such as aluminum, wood or the like. The frame may be of rectangular or square shape and may be defined broadly as being of box-like formation. The sides thereof are of considerable width and are provided at their lower inner edges with inwardly projecting flangelike portions 2 as indicated in Figs. 1 and 2 of the drawing and 2' as indicated in Fig. 3 of the drawing. In both forms of construction oppositely disposed side portions 3 are each provided upon their inner sides with a groove 4 extending lengthwise thereof. These grooves are adapted to receive and engage the opposite ends of plate springs 5 which are pivotally connected at points midway of their lengths by means of pivots 6 to the metal plate 7 of Figs. 1 and 2 and 7' of Fig. 3 constituting parts of the cover structure of the two forms of cassette.

Figures 4, 5:
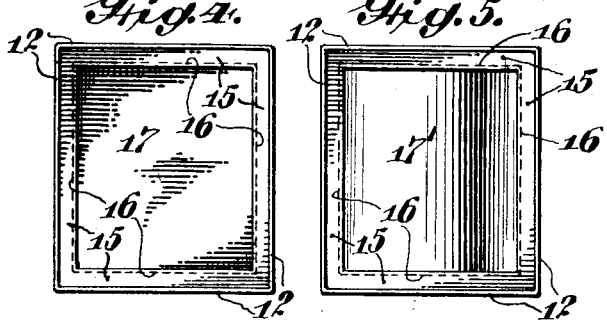
Fig. 4 is an inside view of the front plate of the cassette shown in Figs. 1 and 2.
Fig. 5 is a similar view of the front plate embodied in the cassette illustrated in Fig. 3.

Referring now to Figs. 1, 2 and 4 it will be seen that the under side of the plate 7 is provided with a layer or pad 8 of felt or the like which may be of greater or less thickness. The outer edges of the plate 7 are bent upwardly, outwardly, and then downwardly as indicated at 10 to provide a groove 11 to receive the upper edge of a narrow upwardly extending flange 12 provided upon the outer edge of a horizontally extending flange 15 which has connection at its inner edge with a vertical flange 16 which projects upwardly from the outer edges of the front plate 17 of the cassette. The front plate is supported in the opening 18 between the opposing edges of the flangelike inwardly extending portions 2 of the frame, being supported in such position by the contact of the horizontally extending flanges 15 with the upper convex edge of the bead or ridge 20 provided upon the upper side of the inner edge of the flange 2 previously referred to. The upper edge or side of the ridge or bead 20 being convex and the flange 15 being flat or plane it is apparent that the latter will contact with the said bead along a line. In other words, the lower side or surface of the horizontal flange 15 is tangent to the top edge of the bead or ridge 20. By reason of such line contact the front plate 17 may be moved with more or less readiness with respect to the frame, and the top being mounted upon the said front plate and the springs 5 being pivotally connected with the top it is apparent that if movement of the front plate is effected corresponding movement is caused of the top structure including the plate 7 and the pad 8.

On the inner or bottom side of the pad 8 there may be mounted an intensifying screen 21 the inner or bottom surface of which is provided with a coating of suitable fluorescent material. A similar screen 22 is mounted upon the inner or upper side of the front plate 17 and its inner or upper surface is provided with a coating or layer of suitable fluorescent material. The action of such fluorescent material in X-ray photography upon the impingement thereon of X rays is well understood.

A sensitized photographic plate or film 23 is shown located between the screens 21 and 22.

In the construction as illustrated in Figs. 3 and 5 the cover plate 7', the pad 8' secured thereto, the front plate 17', the screen 21' secured to the inner or under side of the pad 8', and the screen 22' secured to the inner or upper side of the front plate are identical with the corresponding parts shown in Figs. 1 and 2 of the drawing. The parts 5, 10, 11, 12, 15, 16 and 18 of Figs. 3 and 5 of the drawing are identical with the parts correspondingly numbered in Figs. 1, 2 and 4.

The cover structure and the front plate shown in Figs. 3 and 5 of the drawing differ from the corresponding parts of the construction shown in Fig. 1 in that they are curved in cross section, as is clearly indicated in said Fig. 3, the curvature being that of a portion of a cylinder. The construction as disclosed in Fig. 3 differs further from that illustrated in Figs. 1 and 2 in that the flange 15 rests upon the flat surfaces of plates 25 of anti-friction material which is mounted upon the upper sides of the inwardly extending flanges 2'. The presence of such anti-friction material facilitates relative movement between the front plate and the supporting frame 1 therefor.

It will be apparent that the curvature of the portion of the cassette structure shown in Fig. 3 which engages and holds the sensitized photographic plate is not sufficient or such as to interfere with the proper appearance of an image which may be produced upon the film which may be employed therein. It also will be apparent that by reason of the inward curvature of the front plate 17' it is not likely to be bent or bellied outwardly in a manner to prevent contact of the intensifying screens with the surfaces of the film. In other words, the structure as illustrated in Fig. 3 is such as to prevent deformation or change of the front plate thereby rendering necessary its repair or the replacement thereof by a new plate.

It will be seen that by my invention I have provided a cassette of novel construction wherein the front plate is not secured to the rigid frame of the structure whereby if such front plate should become disfigured or distorted it may be removed readily and replaced by a new plate. These plates consisting of stamped sheet metal such as aluminum, or moulded plastic material, such as a phenolic condensation product, may be produced at small expense in consequence of which the replacement of an old plate by a new plate involves but little expense. By thus enabling the replacement of an old plate by a new plate at small expenditure cassette structures are more apt to be kept in first-class operative condition whereby better photographic results may be obtained. This is an advantage of importance when it is considered that devices of this character frequently are employed in the photographing of persons for the purpose of ascertaining the condition of some internal organ or member of the body of such person.

It also will be seen that by my invention I have provided means whereby relative movements between opposing screens and between a screen or screens and the photographic plate in association therewith is prevented.

Having thus described my invention what I claim and desire to secure by Letters Patent is:

1. A cassette comprising a frame having an inwardly extending flange the inner opposing edges of which are spaced from each other to form an opening through the said frame, the upper side of the inner edge of said flange extending upwardly, the outer surface of said upwardly extending portion being convex, a front plate comprising a screen supporting portion having vertical flanges at its outer edges, the upper edges of said vertical flanges being provided with horizontal flanges, the under sides of the latter of which rest upon the convex edge of the upwardly extending portion of the flange upon the said frame, a cover structure for the said front plate, and means for retaining the same together with the said plate upon the said frame.

2. A cassette comprising a frame having inwardly extending flanges the inner opposing edges of which are spaced from each other to provide an opening through the said frame, and a front plate concavo-convex in cross section, said plate being provided with horizontally extending flanges at its opposite edges which are supported upon the upper sides of the inwardly extending flanges of the said frame, a cover plate for said front plate and means for retaining said cover plate upon said frame.

3. A cassette comprising a frame having inwardly extending flanges the inner opposing edges of which are spaced from each other to form an opening through the said frame, a front plate which is concavo-convex in cross section, said plate having vertical flanges and horizontally outwardly extending flanges the latter being supported upon the inwardly extending flanges of the said frame, a cover for the said front plate, and means for yieldingly retaining the said cover in position upon said plate.

4. A cassette comprising an open frame, a front plate supported at its edges upon said frame, a cover plate for the said front plate, which cover plate is supported by the said front plate, and means provided upon one of the said plates for engaging the other to prevent relative sliding movement between said plates.

In testimony that I claim the foregoing as my invention I have hereunto signed my name this 19th day of December, A. D. 1929.

FREDERIC W. REUTER.